United States Patent Office 3,509,109
Patented Apr. 28, 1970

3,509,109
PROCESS FOR THE POLYMERIZATION OR COPOLYMERIZATION OF VINYL CHLORIDE
Robert Buning, Oberlar and Karl-Heinz Diessel and Gerhard Bier, Troisdorf, Germany, assignors to Dynamit Nobel Aktiengesellschaft, Troisdorf, near Cologne, Germany, a corporation of Germany
No Drawing. Filed July 12, 1967, Ser. No. 652,675
Claims priority, application Germany, July 15, 1966, D 50,590; May 12, 1967, D 53,068
Int. Cl. C08f *1/56, 1/46, 3/30*
U.S. Cl. 260—78.5          14 Claims

ABSTRACT OF THE DISCLOSURE

Vinyl chloride homo or copolymerization with a redox cataylst at $-5$ to $-50°$ C. in the presence of methyl reductic acid or tetramethyl reductic acid as the reducing agent of the redox system. Additional use of polymerization regulator such as acetone is required for very low temperature polymerization, e.g. $-25$ to $-50°$ C.

---

The homo and copolymerization of vinyl chloride at low temperatures and in the presence of a redox catalyst is known. Suitable known redox systems include ascorbic acid/hydrogen peroxide/iron salts. This type of polymerization produces polymeric products having very high K values, e.g. 90 or higher. While polymers having high K values are considered to be most desirable, when the K values get to be too high difficulties are encountered in fabricating the polymers into useful articles because their melting or softening points are higher than their thermal decomposition temperature.

This property becomes even more pronounced as the temperature of polymerization is decreased. Thus, particularly with vinyl chloride polymers which have been produced at temperatures of about $-15°$ C. or lower, great difficulty has been encountered in utilizing such polymers even though they have a desirable syndiotactic structure and high softening point.

It is further known that vinyl chloride homo and copolymers have increased shape stability, particularly thermal shape stability, when such have been produced under low temperature redox catalyzed conditions. This thermal shape stability (Vicat temperature) increases as the temperature of polymerization decreases such that polymerization at about $-25°$ C. results in Vicat temperatures (DIN 53460, 200° C. press temperature) above 100° C.

While this increased Vicat temperature is most desirable, there is coupled with it, as a direct result of low temperature polymerization, the increased K value referred to above.

Attempts have been made to produce vinyl chloride homo and copolymers by low temperature polymerization in such manner as to retain the high Vicat temperature and yet reduce the K value to a more manageable number.

To this end, attempts have been made, with some degree of success, to employ regulators in relatively high proportions, e.g. about 2 weight percent or higher based upon the monomer content, in order to produce polymers having a better combination of physical properties. Such regulators include cyclic ethers such as tetrahydrofuran, acetone, tetachloroethylene, dichloroethylene, chloroform, etc.

Further, attempts have been made to produce vinyl chloride homo and copolymers by low temperature polymerization having more moderate K values by the expedient of continuously or discontinuously removing polymer from the polymerization reaction mixture after small amounts of monomer have been converted, e.g. about 10% conversion. While this expedient has proved to be at least partially successful, it will be appreciated that it has economic drawbacks, particularly in that one or more additional steps are added to the conventional polymerization process by this intermediate product removal.

It is therefor an object of this invention to provide a process for the low temperature polymerization of vinyl chloride.

It is another object of this invention to provide low temperature polymerized vinyl chloride polymers having high Vicat temperatures and moderate K values.

It is a further object of this invention to provide a novel catalyst for the low temperature polymerization of vinyl chloride.

It is still another object of this invention to provide a novel polymerization catalyst-polymerization modifier combination for use in the low temperature polymerization of vinyl chloride.

Other and additional objects of this invention will become apparent from a consideration of this entire specification including the claims hereof.

In accord with and fulfilling these objects, one aspect of this invention includes the process of homo or co-polymerizing vinyl chloride at about $-5$ to $-50°$ C. in the presence of a redox catalyst comprising at least one conventional peroxide compound, at least one conventional metal salt and at least one compound selected from the group consisting of methyl reductic acid and tetramethyl reductic acid, and in the presence of a lower alcohol. There may also be employed in the polymerization process one or more of the known polymerization regulators when conducting such polymerization at about $-5$ to $-25°$ C. However, such polymerization regulator must be used at polymerization temperatures of about $-25°$ C. to $-50°$ C. in order to produce vinyl chloride polymer product with an excellent combination of physical properties.

The methyl reductic acid and tetramethyl reductic acid used in this invention are reported by G. Hesse and co-workers in Liebigs Ann. Chem. 609, pp. 57–69 (1957) and 679, pp. 100–106 (1964).

According to this invention, the oxidizing portion of the redox catalyst may be one or more of the peroxides known for this purpose, for example, hydrogen peroxide, methyl hydroperoxide, cyclohexane sulfonyl acetyl peroxide, cumyl hydroperoxide, etc. The metal salts are also known per se and known for use in redox polymerization catalysts. These are exemplified by iron, copper, cobalt, cerium, chromium, etc. sulfates, chlorides, nitrates, acetates, etc. The metal salts peroxide and reducing agent are provided in proportions conventionally employed with known redox polymerization catalysts. Such proportions include about 0.1 to 2.0 moles of peroxide, about 0.1 to 2.0 moles of reducing agent and about $10^{-1}$ to $10^{-5}$ moles of metal salt. The catalyst is provided in a proportion of about 0.1 to 3.0 parts by weight per part by weight of monomer.

The polymerization may be carried out using vinyl chloride alone or one or more comonomers may be co-polymerized with the vinyl chloride. Such comonomers are those generally known in the art which are ethylenically unsaturated and copolymerable with vinyl chloride. Exemplary comonomers include: 1,2 dichloroethylene; trichloroethylene; vinyl acetate; vinyl propionate; vinyl stearate; vinyl ethers such as vinyl alkyl ethers having about 1 to 8 carbon atoms in the alkyl group, for example vinyl ethyl ether; acrylic esters, such as lower alkyl esters having 1 to 8 carbon atoms in the alkyl group such as butyl acrylate; methacrylic esters such as lower alkyl esters having about 1 to 8 carbon atoms in the alkyl group such as methyl methacrylate; acrylonitrile; olefins such as ethylene and propylene, fumerates, maleates, itaconates and the like. Where present, such comonomers may be present in proportion based on the vinyl chloride of up to about 30 weight percent. It is preferred to employ such comonomers in proportion of about 2 to 20 weight percent based on the vinyl chloride.

As noted above, the polymerization is carried out in the presence of a lower alcohol. This lower alcohol may contain about 1 to 6 carbon atoms as, for example, methanol, ethanol, n-propanol, iso-propanol etc. The lower alcohol may be present in proportion of about 8 to 20 weight percent based upon the monomer content.

The polymerization regulators mentioned above include cyclic ethers such as tetrahydrofuran; ketones such as acetone; chlorinated hydrocarbons such as tetrachloroethylene, chloroforms and the like. These modifiers are optional components where the polymerization is carried out at about −5 to −25° C. under which conditions the use of such regulators in combination with the lower alcohol and the special redox catalyst described above make it possible to produce polymers under otherwise identical conditions having lower K values for the same amount of regulator; or makes it possible to produce polymers having the same K value using a lower quantity of regulator.

When polymerizing at about −25 to −50° C., it is necessary to include at least one regulator, and particularly acetone, in the polymerization reaction mixture in order to produce polymers having desirably high Vicat temperatures with adequately low K values. Thus, high monomer conversion rates can be achieved without increasing the catalyst concentration. At these temperatures the regulator, particularly acetone, is used in proportion of about 2 to 15 weight percent based upon the amount of monomers present. Under the above referred to higher temperatures polymerization conditions, concentrations of regulator up to about 5 weight percent based upon monomer can be employed.

Thus, according to this invention, vinyl chloride, with or without comonomers, can be polymerized at about −5 to −25° C. at conversions of over about 50% to produce polymeric products which are syndiotactic and have K values of about 70. These products can easily be formed into useful shaped articles or conventional equipment. Similarly, vinyl chloride, with or without other comonomers can be polymerized according to this invention at about −25 to −50° C. using a polymerization regulator as set forth to produce polymers having Vicat temperatures of over about 100° C. with K values of about 60 to 70. By way of comparison, vinyl chloride polymerized under identical conditions but without the presence of a polymerization regulator, and particularly acetone, produces polymer having a K value of about 80 or higher.

According to another aspect of this invention, where vinyl chloride is subject to very low temperature polymerization as described above, the K value of the product can also be varied to some extent by controlling the degree of conversion and thus the polymerization time. It is possible according to this invention to operate conversions of about 75% or less and obtain polymer products having K values of about 50 to 60.

It is preferred in the practice of this invention to conduct the polymerization described above in a rotating vessel, preferably cylindrical having grinding bodies therein. An alternate apparatus is similar, but is equipped with shearing agitators.

The following examples are illustrations of the practice of this invention without in any way being limited thereon:

Example 1

In a cylindrical vessel of nickel having a diameter of 110 mm. and a capacity of 2 liters, 8 balls of V2A steel having a diameter of 35 mm. are placed, along with 500 g. of monomers, 50 g. of methanol and the redox system set forth. The polymerization temperature is −15° C., and is so maintained by a brine bath. The vessel is rotated on rolls at about 50 revolutions per minute.

Example 2

Prior-art redox system: 1.4 g. of ascorbic acid, 1.4 cc. of $H_2O_2$ (35% solution), 0.7 cc. of iron (II) sulfate solution (1% solution in water).

Example 3

Redox system of the invention: 1.3 g. of methyl reductic acid, 1.4 cc. of $H_2O_2$ (in a 35% solution), 0.7 cc. of iron (II) sulfate solution (1% solution in water).

Example 4

Redox system of the invention: 1.4 g. of tetramethyl reductic acid, 1.4 cc. of $H_2O_2$ (in a 35% solution), 0.7 cc. of iron (II) sulfate (1% solution in water).

Table 1 shows the results obtained under the above-described experimental conditions, giving the K value in relation to the redox system and transformation rate. Formulas 2 to 4 apply to 500 g. of vinyl chloride as monomer.

TABLE 1

| | K values, Example 2 | K values, Example 3 | K values, Example 4 |
|---|---|---|---|
| Conversion percent: | | | |
| 10 | 75 | 54 | 52 |
| 30 | 89 | 63 | 60 |
| 50 | 92 | 64 | 61 |
| 70 | 95 | 70 | 68 |

The K value determination was performed in cyclohexanone.

Examples 5–7

Examples 2–4 are repeated except that 350 g. of vinyl chloride plus 150 g. of vinyl acetate are used instead of 500 g. of vinyl chloride. Results are shown in Table 2.

TABLE 2

Conversion, percent 86
K value, Formula 5, 76
K value, Formula 6, 58
K value, Formula 7, 55

Examples 8–10

Examples 2–4 are repeated except that 485 g. of vinyl chloride plus 15 g. of trichloroethylene are used instead of 500 g. of vinyl chloride. Results are shown in Table 3.

TABLE 3

Conversion, percent 73
K value, Formula 8, 72
K value, Formula 9, 55
K value, Formula 10, 51

Example 11

Into a cylindrical vessel made of nickel and having a diameter of 110 mm. and a capacity of 2 liters there are placed 8 balls of V2A steel having a diameter of 35 mm., plus 500 g. of vinyl chloride, 50 g. of methanol, 2.6 g. of methyl reductic acid, 2.8 cc. of $H_2O_2$ (in 35% solution), 1.4 cc. of iron (II) sulfate solution (1% solution in water). The polymerization temperature is maintained at 35° C. by a brine bath. The vessel is rotated on rolls at 50 r.p.m. Polymerization time is 21 hours, yield 78%, K value 76, Vicat temperature 108° C.

Example 12

Example 11 is repeated except that 2.8 g. of tetramethyl redutic acid is used instead of 2.6 g. of methyl reductic acid. Yield 79%, K value 73, Vicat temperature 108° C.

Example 13

Example 11 is repeated with the amount of catalyst reduced to one half and with the addition of 50 g. of acetone. Polymerization time is 21 hours, yield 84%, K value 69, Vicat temperature 108° C.

Example 14

Example 13 is repeated except that 450 g. of vinyl chloride plus 50 g. of vinyl acetate are used instead of 500 g. of vinyl chloride. Polymerization time 21 hours, yield 75%, K value 64, Vicat temperature 96° C., percent Cl 51.9.

What is claimed is:

1. In the process for producing vinyl chloride polymers by polymerization at about −5 to −50° C. in the presence of a redox catalyst; the improvement which comprises providing as the reducing agent of said redox catalyst at least one member selected from the group consisting of methyl reductic acid and tetramethyl reductic acid; carrying out the polymerization in the presence of a lower alcohol; and, at about −25 to −50° C. carrying out said polymerization in the presence of at least one polymerization regulator which acts to decrease the K value of said vinyl chloride polymer.

2. The improved process claimed in claim 1, wherein said polymerization regulator is at least one member selected from the group consisting of cyclic ethers, ketones, and chlorinated hydrocarbons.

3. The improved process claimed in claim 2 wherein said lower alcohol is present in proportion of about 8 to 20 weight percent based upon the weight of the monomer.

4. The improved process claimed in claim 2 wherein said lower alcohol has about 1 to 6 carbon atoms therein.

5. The improved process claimed in claim 2 wherein said regulator is at least one member selected from the group consisting of tetrahydrofuran, dichloroethylene, tetrachloroethylene, chloroform and acetone.

6. The improved process claimed in claim 2 wherein said regulator is present during polymerization carried out at about −5 to −25° C.

7. The improved process claimed in claim 2 wherein at least one comonomer selected from the group consisting of 1,2-dichloroethylene, trichlorethylene, vinyl acetate, vinyl propionate, vinyl stearate, vinyl ethyl ether, butyl acrylate, methyl methacrylate, acrylonitrile, ethylene, propylene, fumarates, maleates and itaconates is copolymerized with said vinyl chloride.

8. The improved process claimed in claim 7 wherein said comonomer is present in proportion of about 2 to 30 weight percent.

9. The improved process claimed in claim 2 wherein said regulator is acetone and is present in proportion of about 2 to 15 weight percent.

10. A catalyst which is useful for the low temperature polymerization of vinyl chloride comprising the product produced by mixing a peroxide, a metal salt, and at least one member selected from the group consisting of metal reductive acid and tetra metal reductive acid.

11. Catalyst as claimed in claim 10 wherein said peroxide is at least one member selected from the group consisting of hydrogen peroxide, methyl hydroperoxide, cumyl hydroperoxide and cyclohexane sulfonyl acetone peroxide.

12. Catalyst as claimed in claim 10 wherein said salt has an anion selected from the group consisting of sulfate, chloride, nitrate and acetate and a cation selected from the group consisting of iron, copper, cobalt, cerium and chromium.

13. Catalyst as claimed in claim 10 containing about 0.1 to 2.0 moles of peroxide, about 0.1 to 2.0 moles of reducing agent and about $10^{-1}$ to $10^{-5}$ moles of salt.

14. Polymerization medium comprising acetone, a catalyst as claimed in claim 13 and a lower alcohol.

References Cited

UNITED STATES PATENTS

| 2,716,644 | 8/1955 | Simpson | 260—92.8 |
|---|---|---|---|
| 3,382,223 | 5/1968 | Borsini et al. | 260—92.8 |

OTHER REFERENCES

G. Hesse: Liebigs Ann. Chem. 609, pp. 57–69 (1957), and 679, pp. 100–106 (1964).

JOSEPH L. SCHOFER, Primary Examiner

J. KIGHT III, Assistant Examiner

U.S. Cl. X.R.

252—434; 260—85.5, 86.3, 87.1, 87.5, 92.8